United States Patent
Coffey et al.

(10) Patent No.: US 8,108,514 B2
(45) Date of Patent: Jan. 31, 2012

(54) HIGH AVAILABILITY OF INTERNET PROTOCOL ADDRESSES WITHIN A CLUSTER

(75) Inventors: Michael K. Coffey, Shokan, NY (US); Manjunath B. Muttur, Karnataka (IN)

(73) Assignee: International Business Machines Corporation, Armonk, NY (US)

( * ) Notice: Subject to any disclaimer, the term of this patent is extended or adjusted under 35 U.S.C. 154(b) by 462 days.

(21) Appl. No.: 12/061,405

(22) Filed: Apr. 2, 2008

(65) Prior Publication Data

US 2009/0254649 A1    Oct. 8, 2009

(51) Int. Cl.
    *G06F 15/173* (2006.01)
(52) U.S. Cl. ...................................... 709/224
(58) Field of Classification Search ............ 709/204, 709/220–229, 246; 370/270, 465, 477, 351–358, 370/408, 60; 348/211–215, 207; 705/1–5; 725/34–45, 80–101
    See application file for complete search history.

(56) References Cited

U.S. PATENT DOCUMENTS

| | | | |
|---|---|---|---|
| 5,822,531 A * | 10/1998 | Gorczyca et al. | 709/221 |
| 6,470,389 B1 | 10/2002 | Chung et al. | |
| 6,691,165 B1 * | 2/2004 | Bruck et al. | 709/227 |
| 6,785,840 B1 * | 8/2004 | Smith et al. | 714/11 |
| 6,917,626 B1 | 7/2005 | Duvvury | |
| 6,996,502 B2 | 2/2006 | De La Cruz et al. | |
| 7,165,097 B1 * | 1/2007 | Mackin et al. | 709/218 |
| 7,246,256 B2 | 7/2007 | De La Cruz et al. | |
| 7,647,427 B1 * | 1/2010 | Devarapalli | 709/245 |
| 2005/0207414 A1 | 9/2005 | Duvvury | |
| 2005/0213560 A1 | 9/2005 | Duvvury | |
| 2007/0061887 A1 | 3/2007 | Hoover et al. | |

FOREIGN PATENT DOCUMENTS

| | | |
|---|---|---|
| FR | 920020043 | 10/2002 |
| WO | WO9205492 A1 | 4/1992 |
| WO | WO2006108808 A1 | 10/2006 |

OTHER PUBLICATIONS

Carnut et al. "ARP Spoofing detection on switched ethernet networks: a feasibility study", Nov. 4-6, 2003, pp. 1-10.*

* cited by examiner

*Primary Examiner* — Joseph Avellino
*Assistant Examiner* — Mark O Afolabi
(74) *Attorney, Agent, or Firm* — Jon A. Gibbons; Fleit Gibbons Gutman Bongini & Bianco PL

(57) ABSTRACT

A method, information processing system, and computer program storage product manage network layer addresses in a cluster multi-processing environment. Network address assignment in a cluster multi-processing environment is monitored. A network address currently assigned to a first network interface is determined, in response to monitoring network address assignment, to have been assigned to a second network interface. The first network interface is triggered to send an update message to at least one computing node communicatively coupled to the first network interface triggering in response to determining that a network address currently assigned to a first network interface has been assigned to a second network interface. The update message informs the computing node to transmit data associated with the network address to the first network interface.

17 Claims, 4 Drawing Sheets

HIGH AVAILABILITY OF INTERNET PROTOCOL ADDRESSES WITHIN A CLUSTER

FIELD OF THE INVENTION

The present invention generally relates to the field of cluster multi-processing, and more particularly relates to managing Internet Protocol address availability in a cluster multi-processing environment.

BACKGROUND OF THE INVENTION

Clustering servers enables parallel access to data, which can help provide the redundancy and fault resilience required for business-critical applications. Clustering applications, such as HACMP™™ (High Availability Cluster Multi-Processing) provided by International Business Machines ("IBM") of Armonk, N.Y., provide tools to help install, configure and manage clusters in a highly productive manner. HACMP™ provides monitoring and recovery of clustered computer resources for use in providing data access and backup functions (e.g., a mission critical database). HACMP™ also enables server clusters to be configured for application recovery/restart to provide protection for business-critical applications through redundancy.

Typically, in a High Availability Cluster, there is a group of loosely coupled nodes that all work together to ensure a reliable service to clients. The high availability is achieved by continuously monitoring state of applications and all the resources on which the application depends to be alive. If an application abnormally terminates or if the operating system suddenly fails then the applications are automatically restarted on the backup server. This process of restarting the application on a backup server is herein referred to as "fall-over". When the network adapter or operating system fails, clusterware within the HACMP™ environment initiates an application fall-over during which, along with critical applications, the Internet Protocol ("IP") address of the primary server used by the applications to communicate with the clients is also moved to the backup server. The clients generally reconnect to the same IP address which is now held by the backup server. Therefore, TCP/IP address is also considered as a highly available resource and is referred as a "service IP address".

However, when the IP address of the primary server is moved to the backup server, the clients are unaware of this move until a TCP/IP timeout occurs. In other words, even though the primary sever has failed, the client continues to send TCP/IP packets to the primary sever. Eventually, the client determines that a reply has not been received after a timeout period has expired. The client then disconnects its current connection with the primary server and establishes a new connection with the backup server. This process is very costly for the service providers because of the lengthy downtime experienced before the client makes establishes a new connection with the backup server.

Therefore a need exists to overcome the problems with the prior art as discussed above.

SUMMARY OF THE INVENTION

A method for managing network layer addresses in a cluster multi-processing environment is disclosed. The method includes monitoring network address assignment in a cluster multi-processing environment. A network address currently assigned to a first network interface is determined, in response to monitoring network address assignment, to have been assigned to a second network interface. The first network interface is triggered to send an update message to at least one computing node communicatively coupled to the first network interface triggering in response to determining that a network address currently assigned to a first network interface has been assigned to a second network interface. The update message informs the computing node to transmit data associated with the network address to the first network interface.

In another embodiment, an information processing system for managing network layer addresses in a cluster multi-processing environment is disclosed. The information processing system includes a memory and a processor that is communicatively coupled to the memory. The information processing system further includes a network address availability manager that is communicatively coupled to the memory and the processor. The network address availability manager is adapted to monitor network address assignment in a cluster multi-processing environment. A network address currently assigned to a first network interface is determined, in response to monitoring network address assignment, to have been assigned to a second network interface. The first network interface is triggered to send an update message to at least one computing node communicatively coupled to the first network interface triggering in response to determining that a network address currently assigned to a first network interface has been assigned to a second network interface. The update message informs the computing node to transmit data associated with the network address to the first network interface.

In yet another embodiment, a computer storage program product for managing network layer addresses in a cluster multi-processing environment is disclosed. The computer storage program product includes instructions for monitoring network address assignment in a cluster multi-processing environment. A network address currently assigned to a first network interface is determined, in response to monitoring network address assignment, to have been assigned to a second network interface. The first network interface is triggered to send an update message to at least one computing node communicatively coupled to the first network interface triggering in response to determining that a network address currently assigned to a first network interface has been assigned to a second network interface. The update message informs the computing node to transmit data associated with the network address to the first network interface.

One advantage of the various embodiments of the present invention is that application down time is avoided when IP conflicts exits in a cluster multi-processing environment. Application downtime can be very expensive for a customer. Therefore, when an IP conflict exists such as when a fall-over procedure is performed various embodiments of the present invention are able to move the IP address of the failed system to the backup system without losing a client's current connection to the IP address.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

DETAILED DESCRIPTION

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure and function. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and other similar terms as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

Computer Cluster Environment

Figure 1:
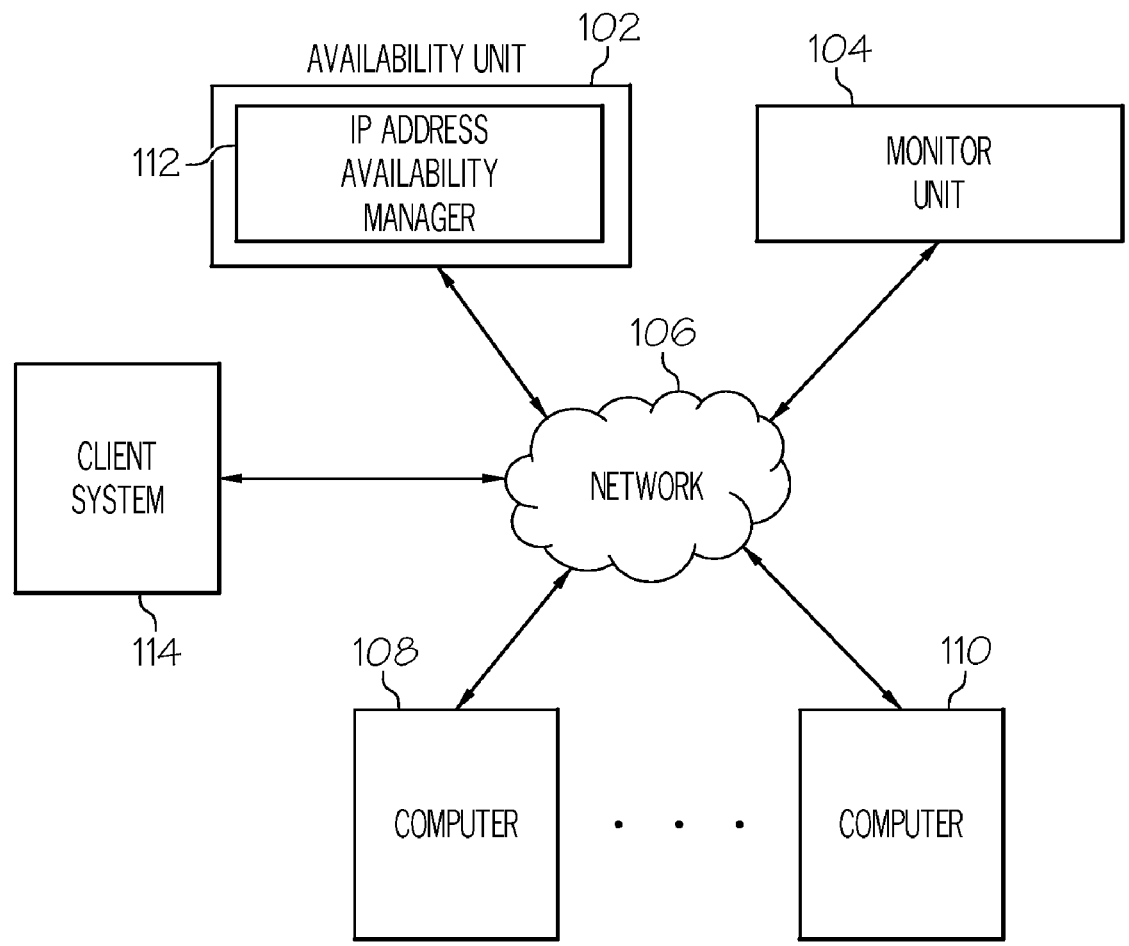
FIG. 1 is a block diagram illustrating an example of cluster multi-processing environment according to one embodiment of the present invention.

FIG. 1 is a block diagram illustrating a system architecture for a node cluster according to one embodiment. An availability unit 102 provides availability and recovery functions (such as a recovery process) for nodes 108, 110 in a cluster on a network 106. The HACMP™™ product of IBM is an example of an availability unit 102. As discussed above, HACMP™ provides monitoring and recovery of clustered node resources for use in providing data access and backup functions (e.g., a mission critical database). HACMP™ also enables server clusters to be configured for application recovery/restart to provide protection for business-critical applications through redundancy. For example, the first node 108 can be a primary server that provides services to the nodes 108, 110. If this node 108 fails, the availability unit 102 performs recovery functions and moves the workload of this node 108 to the second node 110 which can be a backup server. FIG. 1 also shows a client system 114 communicatively coupled to one or more of the nodes 108, 110 via the network 106.

In one embodiment, the availability unit 102 includes an IP address availability manager 112. The IP address availability manager 112, in one embodiment, manages IP address assignment and resolves IP address conflicts. The IP address availability manager 112 is discussed in greater detail below. A monitor unit 104 provides monitoring functions (such as a monitoring process) for the nodes 108, 110 in the cluster on network 106. The RSCT product of IBM is an example of a monitor unit 104. RSCT provides error detection for TCP/IP based node networks. RSCT is a clustering infrastructure that can be used by HACMP™ for providing higher-level recovery functions. RSCT sends messages, known as heartbeat messages, across each network interface connected to the network. When heartbeat messages are no longer received via a particular network interface, that network interface is considered dead or unconnected It should be noted that while only two nodes 108, 110 are shown in FIG. 1, the availability unit 102 and monitor unit 104 support a cluster comprising more than two nodes. In further embodiments, any number of cluster nodes 108 through 110 is supported. In some embodiments, the computer systems of availability unit 102, monitor unit 104, and nodes 108, 110 include one or more Personal Computers ("PCs") (e.g., IBM or compatible PC workstations running the Microsoft Windows® operating system, Macintosh® nodes running the Mac OS operating system, or equivalent), Personal Digital Assistants ("PDAs"), game consoles or any other information processing devices. Additionally, in some embodiments, the computer systems of availability unit 102, monitor unit 104, and nodes 108, 110 include a server system (e.g., SUN Ultra® workstations running the Solaris® operating system or IBM RS/6000® workstations and servers running the AIX operating system). In one embodiment, the availability unit 102 and the monitor unit 104 are processes running on one of the nodes 108, 110 of the cluster, or on one or more additional nodes or servers that are connected to the network 106.

In the one embodiment, the network is a packet switched network utilizing the Internet Protocol (or "IP"). The packet switched network is a wide area network ("WAN"), such as the global Internet, a private WAN, a local area network ("LAN"), a telecommunications network or any combination of the above-mentioned networks. In further embodiments, any protocol can be used and the network can be a wired network, a wireless network, a broadcast network, a point-to-point network, or a circuit switched network (e.g., the Public Service Telephone Network).

Figure 2:
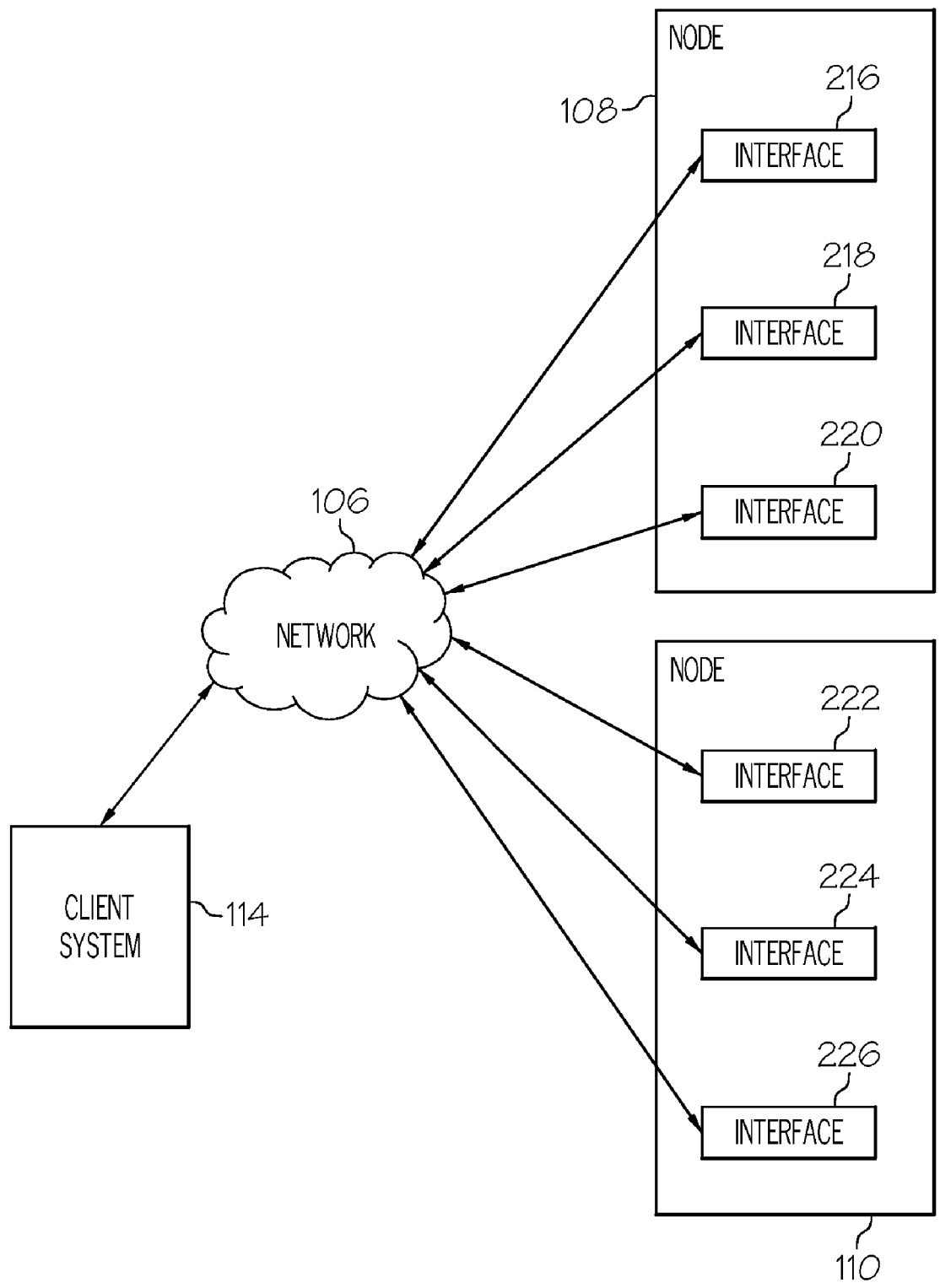
FIG. 2 is a block diagram illustrating a more detailed view of a computer cluster.

FIG. 2 is a more detailed block diagram of a portion of the computer cluster of FIG. 1. FIG. 2 shows the client system 114 communicatively coupled to at least one of the nodes 108, 110 of FIG. 1 connected to the network 106. As shown in this illustrative embodiment, node 108 is connected to the network 106 via three network interface adapters 216, 218, 220. Similarly, node 110 is connected to the network 106 via three network interface adapters 222, 224, 226. The client system 114 communicates with the nodes 108, 110 through one of the interfaces 216 through 226. A network interface adapter, often abbreviated as NIC, is an expansion board, PCMCIA card, built-in device or some other module coupled to a computer so as to interface the computer with a network 106. Most NICs are designed for a particular type of network, protocol, and media, although some can serve multiple networks. One example of a NIC is an Ethernet adapter for connecting a computer to a network using the TCP/IP protocol. In this document, the term "network interface" is used interchangeably with "network interface adapter," "adapter," "network interface card" and "NIC."

The nodes 108, 110 are nodes of the cluster. Thus, the network interfaces 216 through 222 are grouped into nodes of the cluster. For example, the network interfaces 216, 218, 220 are grouped into a first node 108, while network interfaces 222, 224, 226 are grouped into a second node 110. While the embodiment illustrated in FIG. 2 has three network interfaces per node (or computer) connected to one network, further embodiments of the present invention can have any number of network interfaces per node, different numbers of network interfaces for different nodes, and network interfaces connected to any number of networks. In various embodiments, each node 108, 110 has at least two network interfaces connected to each network in order to provide the redundancy that is required for recovery operations. Further, although FIG. 2 shows only two nodes, the present invention supports any number of nodes.

Ensuring High Availability of IP Addresses

When a network adapter or operating system fails, the availability unit 102 initiates an application fall-over procedure. As discussed above, the fall-over procedure redirects critical applications and the service IP address of a primary server used by the applications to communicate with the nodes 108, 110 to a backup server. However, situations can arise in which a service IP address can fail even if the network adapter is working properly. This is possible during IP conflict situations in which the same service IP address is configured on another interface at the same time.

For example, when interface "B" is configured with duplicate IP address which is in use by interface "A" then any new incoming traffic intended for original interface "A'" is redirected to interface "B", which "stole" the IP address. This can lead to data starvation and eventually application failure on interface "A". In addition to the application failing, if this error was a deliberate attempt of an intruder or malicious application then this IP conflict situation also results in compromising the security of application data traffic. Many operating systems provide mechanisms to detect this duplicate IP address situations, and in response, log an error to alert the network administrator. For example, an AIXIF_ARP_DUP_ADDR error is logged in an error report file by AIX systems.

Traditionally, when availability units detect this error message, one of the following conventional actions are taken: (1) shutdown the applications without initiating any fall-over procedures and (2) initiate an application fall-over to some other node in the cluster (since fall-over involves movement of IP address, the fall-over procedure automatically recovers the lost IP address). However, these conventional responses to an IP conflict are problematic. For example, both solutions result in application downtime that is either permanent or temporary. Also, the IP conflict usually occurs due to an incorrect IP address configuration by a system administrator who is unaware that an IP address is already in use. Accordingly, a conflict situation usually lasts for a few seconds until the system administrator receives the error message and corrects it immediately. Therefore, completely shutting down or performing an application fall-over as soon as the error is noticed is not beneficial.

One possible solution for overcoming these problems is configuring the availability unit in a way such that when the availability unit detects an IP conflict it waits until the conflict is resolved by the system administrator before initiating an action. However, this solution also has a drawback in that if the availability unit waits too long, the TCP connections of the applications eventually timeout (due to lack of activity) and this also leads to user downtime. In a High Availability Cluster environment that is running an availability unit such as HACMP™, this type of operator error can unnecessarily cause business downtime of several minutes. Typically in these environments, the downtime of few seconds can potentially cause a customer to lose millions of dollars.

On the other hand, the IP address availability manager 112 of the present invention, in one embodiment, overcomes these problems by preventing application downtime and protects the application network traffic from being "stolen" in the event of IP conflicts. In one embodiment, the availability unit 102 detects an IP conflict situation by monitoring one or more system error report files for any duplicate IP address errors logged by the Address Resolution Protocol ("ARP") subsystem. The ARP subsystem is used to resolve network layer address to hardware addresses.

In one embodiment, when the availability unit 102 detects the IP conflict, the IP address availability manager 112, instructs the affected interface 216 to "defend" its lost IP address as compared to recovering from the conflict situation. For example, if interface "A" loses its service IP address of "a.b.c.d", interface A is instructed by the IP address availability manager 112 to inform all other nodes in the LAN to update their respective ARP cache with the MAC address of interface "A" for the service IP "a.b.c.d".

As discussed above, when an IP address is currently assigned to a first network interface and that same IP address is subsequently assigned to a second interface, new data traffic associated with that IP address is redirected to the second interface. Data starvation can occur at the first network interface and application on the first network interface eventually fails. However, in one embodiment of the present invention, an interface that has lost its IP address to another interface, such as interface "A" in the above example, defends its lost IP address. Stated differently, interface "A" notifies the nodes communicatively coupled to interface "A" to direct any data traffic associated with the IP address to interface "A" and not interface "B".

For example, interface "A" can inform the other nodes to update their ARP cache by broadcasting a Gratuitous ARP packet that includes the service IP address "a.b.c.d" and the MAC address of interface "A". The Gratuitous ARP packet includes, among other things, the Sender Hardware Address ("SHA") of interface "A" and the Sender Protocol Address ("SPA") of interface "A". The Gratuitous ARP packet is used by interface "A" to update the ARP caches of the nodes that receive the packet so that the nodes continue to transmit data to interface "A" and not interface "B". The sending and receiving of the ARP packets is a function of the IP layer (Kernel). Interfaces generally send out Gratuitous ARP packets when an IP address is configured on an interface and/or when the interface or system (what includes the interface) comes online.

Therefore, the IP address availability manager 112, in one embodiment, triggers broadcast of Gratuitous ARP packets by momentarily bringing down the interface that has lost its IP address, which is interface "A" in this example and bringing the interface back up again. This causes the Gratuitous ARP packets to be transmitted from interface "A" to the various nodes so that the nodes transmit data associated with the IP address to interface "A" and not interface "B". As can be seen, interface "A", in this example, has successfully defended the IP address and prevents data from being redirected to interface "B".

It should be noted that since the interface 216 goes offline temporarily very few packets of the existing connections may get lost and these packets are eventually retransmitted by its sender. Therefore, the TCP connections remain active and the application on the interface 216 does not fail. Also, defending the IP address that was mistakenly acquired by another interface such as interface "B" in the example above, does not harm the interface in any way. This is because the process discussed above occurs within a short period of time from when new interface acquires the IP address. Additionally, a limit can be set on how many times an interface can perform the "defending" process discussed above. This is advantageous in some situations where the contending interface, which "stole" the IP address, is not ready to relinquish that IP address and continues to defend the same IP indefinitely. This may lead to Gratuitous ARP flood/storm in the LAN/subnet The various embodiments of the present invention discussed above are advantageous because TCP connections remain active, thereby preventing applications from failing. This avoids application downtime, which can be very expensive, from occurring. Furthermore, because an interface temporarily goes offline, thereby trigger Gratuitous ARP packets to be sent out, very few packets of the existing connections may get lost. If any packets are lost they eventually get retransmitted by their senders.

Operational Flow for Ensuring High Availability of IP Addresses in a Cluster

Figure 3:
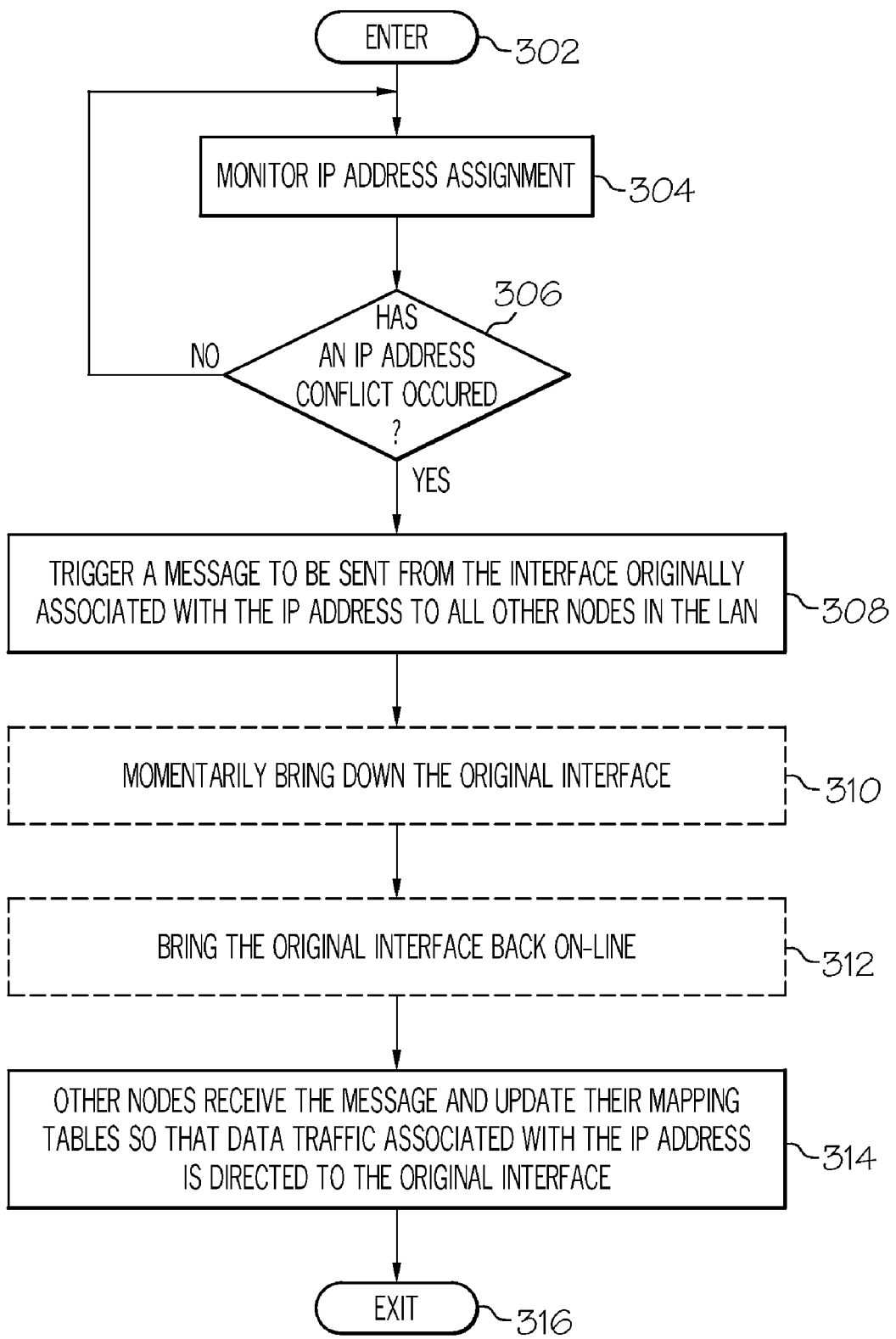
FIG. 3 is an operational flow diagram illustrating an overall process of ensuring high availability of IP addresses in a cluster multi-processing environment according to one embodiment of the present invention.

FIG. 3 is an operational flow diagram illustrating one example of an ensuring high availability of IP addresses in a cluster multi-processing environment. The operational flow diagram of FIG. 3 begins at step 302 and flows directly to step 304. The a IP address availability manager 112, at step 304, monitors IP address assignment between interfaces 216 to 226. The IP address availability manager 112, at step 306, determines if an IP address conflict exists. For example, the IP address availability manager 112 analyzes a system error report file to determine if an IP address that is currently assigned to a first network interface has been subsequently assigned to a second interface.

If the result of this determination is negative, the IP address availability manager 112 continues to monitor IP address assignments. If the result of this determination is positive, the IP address availability manager 112, at step 308, triggers a message to be sent from the original interface 216 associated with the IP address in conflict to all of the other nodes in the LAN. For example, the IP address availability manager 112 can cause the interface 211 to be brought down at step 310 and then back up again at step 312. This causes Gratuitous ARP packets to be sent from the interface 211 to the other nodes.

The other nodes, at step 314, receive the message and update their mapping tables. This causes data traffic associated with the IP address in conflict that is transmitted from the nodes to be transmitted to the original interface 216 as compared to the new interface 226. Therefore, the client system 114 can maintain its current connection with the IP address that has been moved and is not required to establish a new connection. This is advantageous because application down time, which can be very costly to customers, is avoided. The control flow then exits at step 316.

Example of a Node in a Cluster

Figure 4:
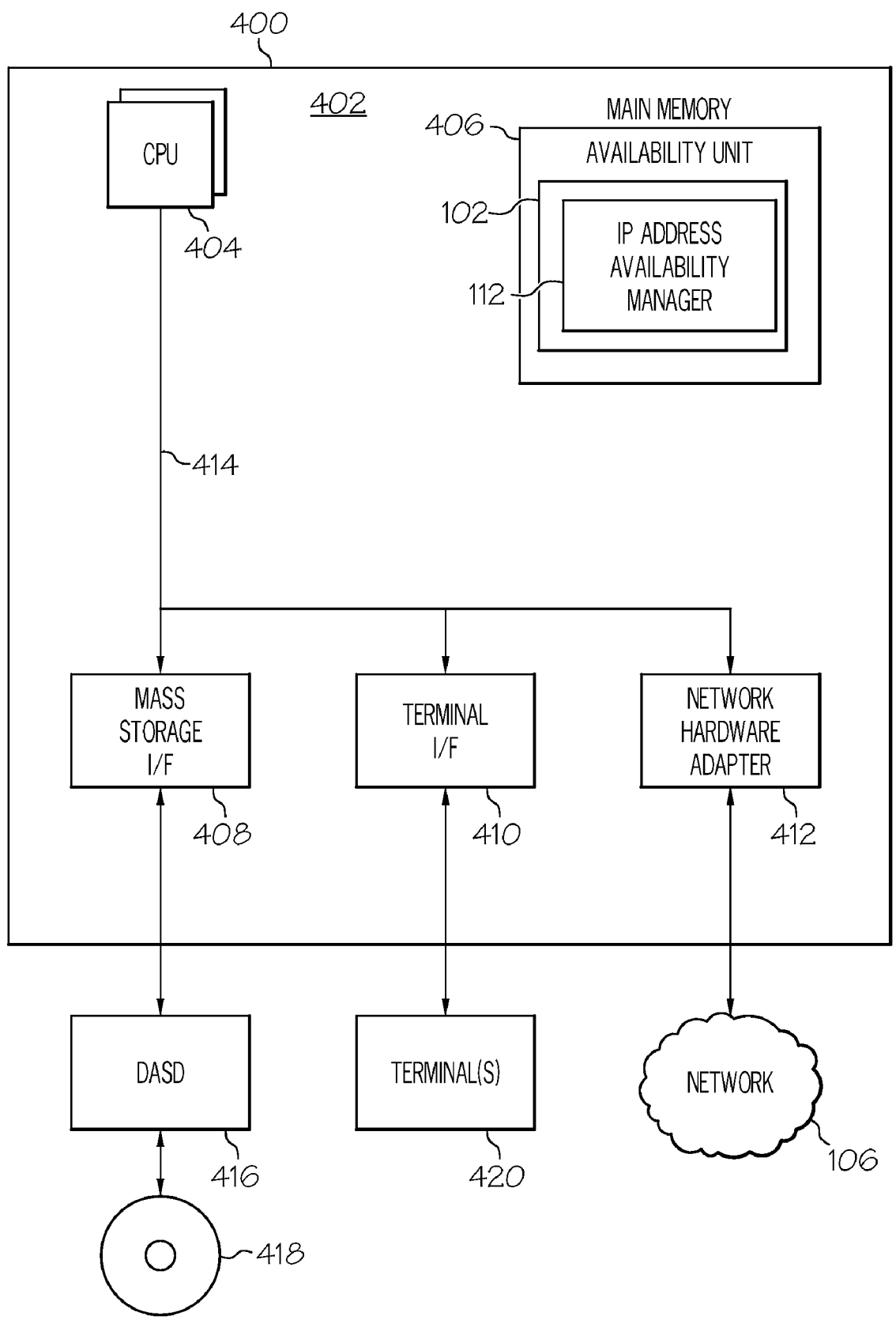
FIG. 4 is a block diagram illustrating a detailed view of a computing node according to an embodiment of the present invention.

FIG. 4 is a block diagram illustrating a more detailed view of node 400, such as the node 108, 110 shown in FIG. 1, according to one embodiment of the present invention. The node 400 is based upon a suitably configured processing system adapted to implement one embodiment of the present invention, according to the present example. Any suitably configured processing system is similarly able to be used as the node 400 by various embodiments of the present invention such as a personal computer, a workstation, or the like.

The node 400 includes a computer 402. The computer 402 has a processor 404 (CPU) that is connected to a main memory 406, mass storage interface 408, terminal interface 410, and network adapter hardware 412. A system bus 414 interconnects these system components. The mass storage interface 408 is used to connect mass storage devices, such as data storage device 416, to the node 400. One specific type of data storage device is a data drive capable of writing to/reading from a computer readable medium such as (but not limited to) a floppy disk, flash memory, or CD/DVD 418. Another type of data storage device is a data storage device configured to support, for example, NTFS type file system operations or any other type of file system operations.

The main memory 406, in one embodiment, includes the availability unit 102 and the IP address availability manager 112, which have been discussed above. The main memory 406, in one embodiment, can also include the monitor unit 104. Although illustrated as concurrently resident in the main memory 406, it is clear that respective components of the main memory 406 are not required to be completely resident in the main memory 406 at all times or even at the same time. In one embodiment, the node 400 utilizes conventional virtual addressing mechanisms to allow programs to behave as if they have access to a large, single storage entity, referred to herein as a computer system memory, instead of access to multiple, smaller storage entities such as the main memory 406 and data storage device 416. Note that the term "computer system memory" is used herein to generically refer to the entire virtual memory of the node 400.

Although only one CPU 404 is illustrated for computer 402, computer systems with multiple CPUs can be used equally effectively. Various embodiments of the present invention further incorporate interfaces that each includes separate, fully programmed microprocessors that are used to off-load processing from the CPU 404. Terminal interface 410 is used to directly connect one or more terminals 420 to computer 402 to provide a user interface to the computer 402. These terminals 420, which are able to be non-intelligent or fully programmable workstations, are used to allow system administrators and users to communicate with the information processing system 302. The terminal 420 is also able to consist of user interface and peripheral devices that are connected to computer 402 and controlled by terminal interface hardware included in the terminal interface 410 that includes video adapters and interfaces for keyboards, pointing devices, and other devices/interfaces.

An operating system (not shown) included in the main memory is a suitable multitasking operating system such as the AIX, Linux, UNIX, Windows XP, and Windows Server 2001 operating systems. Various embodiments of the present invention are able to use any other suitable operating system. Some embodiments of the present invention utilize architectures, such as an object oriented framework mechanism, that allow instructions of the components of operating system (not shown) to be executed on any processor located within the node 400. The network adapter hardware 412 such as the interface 216 discussed above is used to provide an interface to the network 106. Various embodiments of the present invention can be adapted to work with any data communications connections including present day analog and/or digital techniques or via a future networking mechanism.

Although the embodiments of the present invention are described in the context of a fully functional computer system, those skilled in the art will appreciate that various embodiments are capable of being distributed as a program product via CD or DVD, e.g. CD 418, CD ROM, or other form of recordable media, or via any type of electronic transmission mechanism.

Non-Limiting Examples

The present invention can be realized in hardware, software, or a combination of hardware and software. A system according to one embodiment of the invention can be realized in a centralized fashion in one computer system or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

In general, the routines executed to implement the embodiments of the present invention, whether implemented as part of an operating system or a specific application, component, program, module, object or sequence of instructions may be referred to herein as a "program." The computer program typically is comprised of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method of managing network layer addresses in a cluster multi-processing environment, the method comprising:
    monitoring network address assignment in a cluster multi-processing environment;
    determining, in response to monitoring network address assignment, that a network address currently assigned to a first network interface has been assigned to a second network interface;
    shutting down the first network interface in response to a network address currently assigned to a first network interface has been assigned to a second network interface; and
    bringing the first network interface back on-line in response to shutting down the first network interface,
    the first network interface, in response to being shut down and being brought back on-line, sending a mapping table update message to at least one computing node communicatively coupled to the first network interface, wherein the update message informs the computing node to update a mapping table associated with the computing node to transmit data associated with the network address to the first network interface, the mapping table being updated to re-map the network address associated with the second network interface back to the first network interface.

2. The method of claim 1, wherein the network address is an Internet Protocol Address.

3. The method of claim 1, wherein the update message instructs the computing node to update an entry associated with the network address in a network routing table of the computing node with a Media Access Control address associated with the first network interface.

4. The method of claim 1, wherein the update message is a Gratuitous Address Resolution Protocol packet.

5. The method of claim 1, wherein shutting down the first network interface and bringing the first network interface back on-line is performed within a time frame that is less than a packet timeout period.

6. The method of claim 1, further comprising:
    transmitting, by the computing node, at least one data packet associated with the network address to the first network interface.

7. An information processing system for managing network layer addresses in a cluster multi-processing environment, the information processing system comprising:
    a memory;
    a processor communicatively coupled to the memory; and
    a network address availability manager communicatively coupled to the memory and the processor, wherein the network address availability manager is adapted to:
        monitor network address assignment in a cluster multi-processing environment, the network address availability manager being adapted to monitor network address assignment by at monitoring one or more system error report files;
        determine, in response monitoring one or more system error report files, that a network address currently assigned to a first network interface has been assigned to a second network interface;
        shut down the first network interface in response to a network address currently assigned to a first network interface has been assigned to a second network interface; and
        bring the first network interface back on-line in response to shutting down the first network interface,
    the first network interface, in response to being shut down and being brought back on-line, sending a mapping table update message to at least one computing node communicatively coupled to the first network interface, wherein the update message informs the computing node to update a mapping table associated with the computing node to transmit data associated with the network address to the first network interface, the mapping table being updated to re-map the network address associated with the second network interface back to the first network interface.

8. The information processing system of claim 7, wherein the network address is an Internet Protocol Address.

9. The information processing system of claim 7, wherein the update message instructs the computing node to update an entry associated with the network address in a network routing table of the computing node with a Media Access Control address associated with first network interface.

10. The information processing system of claim 7, wherein the update message is a Gratuitous Address Resolution Protocol packet.

11. The information processing system of claim 7, wherein shutting down the first network interface and bringing the first network interface back on-line is performed within a time frame that is less than a packet timeout period.

12. A non-transitory computer program storage product for managing network layer addresses in a cluster multi-processing environment, the computer program storage product comprising instructions for:
    monitoring network address assignment in a cluster multi-processing environment;
    determining, in response to monitoring network address assignment, that a network address currently assigned to a first network interface has been assigned to a second network interface;

shutting down the first network interface in response to a network address currently assigned to a first network interface has been assigned to a second network interface; and bringing the first network interface back on-line in response to shutting down the first network interface, the first network interface, in response to being shut down and being brought back on-line, sending a mapping table update message to at least one computing node communicatively coupled to the first network interface, wherein the update message informs the computing node to update a mapping table associated with the computing node to transmit data associated with the network address to the first network interface, the mapping table being updated to re-map the network address associated with the second network interface back to the first network interface.

13. The non-transitory computer program storage product of claim 12, wherein the network address is an Internet Protocol Address.

14. The non-transitory computer program storage product of claim 12, wherein the update message instructs the computing node to update an entry associated with the network address in a network routing table of the computing node with a Media Access Control address associated with the first network interface.

15. The non-transitory computer program storage product of claim 12, wherein the update message is a Gratuitous Address Resolution Protocol packet.

16. The non-transitory computer program storage product of claim 12, wherein shutting down the first network interface and bringing the first network interface back on-line is performed within a time frame that is less than a packet timeout period.

17. The non-transitory computer program storage product of claim 12, further comprising instructions for:

transmitting, by the computing node, at least one data packet associated with the network address to the first network interface.

* * * * *